United States Patent

[11] 3,612,375

[72] Inventor Hisashi Baba
Tokyo, Japan
[21] Appl. No. 843,379
[22] Filed July 22, 1969
[45] Patented Oct. 12, 1971
[73] Assignee Kyokuyo Electric Co. Ltd.
Idogi Ageo-shi Saitama-ken, Japan

[54] DRIVING MECHANISM FOR CASSETTE TYPE SOUND RECORDING AND REPRODUCING APPARATUS
9 Claims, 5 Drawing Figs.

[52] U.S. Cl. 226/188
[51] Int. Cl. B65h 17/20
[50] Field of Search 226/188; 242/55.19 A, 197–200; 74/242.8, 242.9

[56] References Cited

UNITED STATES PATENTS

| | | | |
|---|---|---|---|
| 2,876,450 | 3/1959 | Eddleblute | 74/242.9 UX |
| 2,963,918 | 12/1960 | Blakstad | 74/242.8 |
| 3,464,613 | 9/1969 | Ura | 226/188 X |

*Primary Examiner*—Richard A. Schacher
*Attorney*—Michael S. Striker

ABSTRACT: A tape recorder wherein the frame supports a motor which drives a flywheel by means of an endless belt. The flywheel is mounted on a platform which is reciprocable toward and away from the motor, and the belt is tensioned by a spring-biased roll which is mounted on the platform. A spring biases the platform away from the motor and the platform is moved toward the motor in response to placing of a cassette onto the frame and in response to subsequent shifting of the cassette toward the motor.

INVENTOR
HISASHI BABA
BY [signature]
ATTORNEY

INVENTOR
*HASASHI BABA*
BY
ATTORNEY

INVENTOR
*HISASHI BABA*
BY
[signature]
ATTORNEY

DRIVING MECHANISM FOR CASSETTE TYPE SOUND RECORDING AND REPRODUCING APPARATUS

BACKGROUND OF THE INVENTION

The present invention relates to sound recording and reproducing apparatus in general, and more particularly to improvements in tape recorders which employ cassettes or magazines for magnetic tape. Still more particularly, the invention relates to improvements in the construction and mounting of mechanisms which drive rotary parts of a portable tape recorder.

In presently known portable tape recorders, the prime mover (normally an electric motor) is mounted on a movable platform which is displaced in response to insertion or withdrawal of a cassette. When the cassette is removed, the platform is caused to perform a rapid movement from an operative to an idle position to thereby subject the motor to a shock which is likely to cause damage. As a rule, such tape recorders comprise a helical spring which propels the platform to inoperative position by overcoming the weight and/or inertia of the motor, its platform as well as certain other parts which share the movements of the platform. The spring must be rather strong because it should be effective even if the motor must be displaced from a lower level to a higher level while the platform moves toward its idle position. Such strong spring is likely to cause damage to the motor when the platform is permitted to spring back to its idle position.

SUMMARY OF THE INVENTION

An object of my invention is to provide a tape recorder for use with cassettes wherein the prime mover of the driving mechanism for rotary parts is mounted in a novel and improved way and wherein such mechanism is ready for operation in each position of the movable platform.

Another object of the invention is to provide a tape recorder wherein the customary flywheel is connected with the prime mover of the driving mechanism in a novel and improved way.

A further object of the invention is to provide a driving mechanism which can be installed and used in conventional tape recorders upon relatively minor alterations in the design and functioning of such apparatus.

An additional object of the invention is to provide a tape recorder wherein the insertion of a fresh cassette requires the exertion of a relatively small force.

The improved driving mechanism is particularly suited for use in cassette type sound recording and reproducing apparatus and comprises a first support which preferably constitutes the frame of a tape recorder, an electric motor or another suitable prime mover mounted on the first support and having a rotary output member, a rotary driven member mounted on a second support which is movable toward and away from the motor to thereby respectively reduce and increase the distance between the output member and the driven member, an endless flexible element trained over the two members to rotate the driven member in response to rotation of the output member, and yieldable tensioning means preferably mounted on the second support and engaging the flexible element to stress the latter in each position of the second support. The tensioning means preferably comprises a roll which is mounted on a pivotable lever biased by a spring to thereby urge the roll against a portion of the flexible element between the output member and the driven member. The latter may constitute a flywheel which is rotated to wind or rewind the tape stored in a cassette which can be mounted on a portion of the first support. The arrangement is preferably such that the cassette serves as a means for moving the second support toward the motor and that a spring which operates between the two supports tends to move the second support away from the motor.

The novel features which are considered as characteristic of the invention are set forth in particular in the appended claims. The improved driving mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
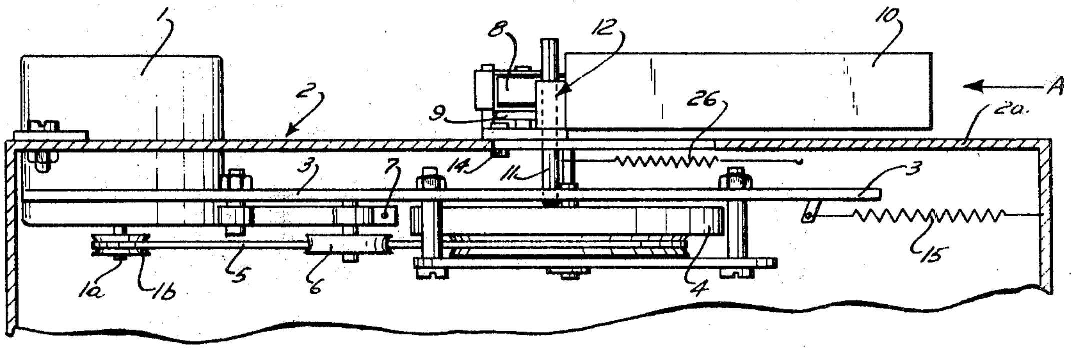
FIG. 1 is a schematic side elevational view of a tape recorder including a driving mechanism which embodies the present invention, the second support being shown in a position at a minimum distance from the prime mover.
Figure 2:
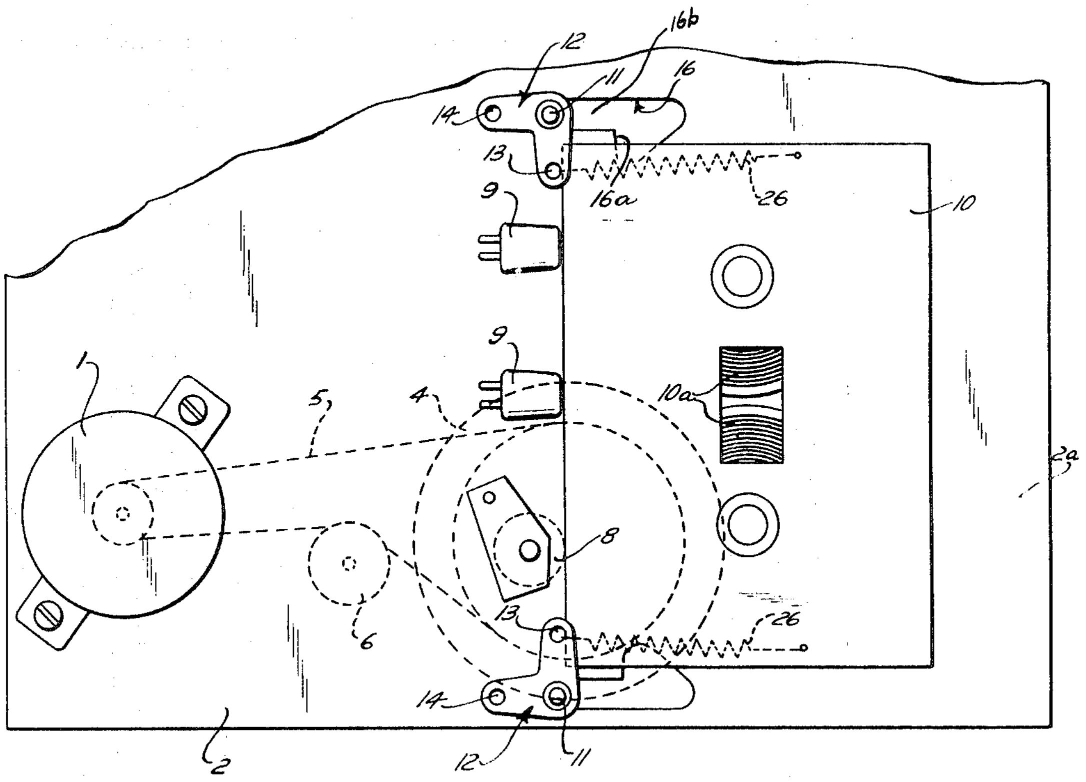
FIG. 2 is a top plan view of a portion of the structure shown in FIG. 1.
Figure 3:
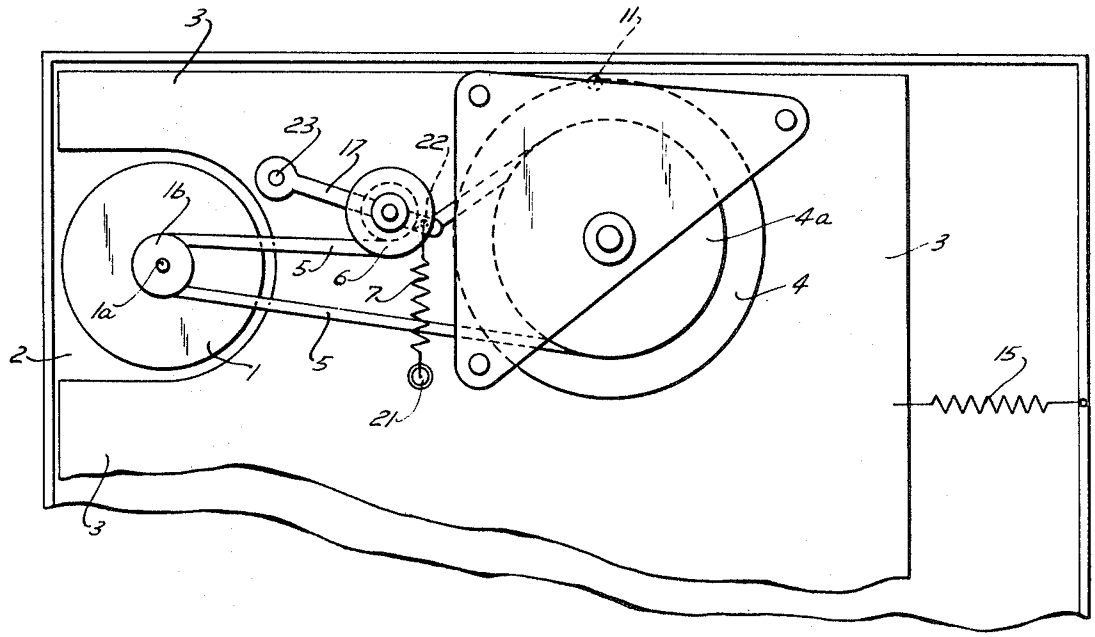
FIG. 3 is a bottom plan view of a portion of the structure shown in FIG. 1.

Referring first to FIGS. 1 to 3, there is illustrated a portion of a portable tape recorder which includes a first support or frame 2 supporting a prime mover here shown as a small electric motor 1 whose output member includes a shaft 1*a* and a driver pulley 1*b*. This driver pulley 1*b* can rotate a driven pulley 4*a* by way of an endless flexible belt 5. The pulley 4*a* forms part of a rotary driven member which further includes a flywheel 4 mounted on a reciprocable second support or platform 3. The right-hand portion 2*a* of the frame 2 constitutes a deck which can support a magazine or cassette 10 containing two reels and a supply of magnetic tape 10*a*. The manner in which the flywheel 4 can drive the reels in the cassette 10 forms no part of the present invention.

The tape recorder further comprises a tensioning device for the belt 5. This tensioning device includes a tensioning roll 6 mounted on the intermediate portion of a one-armed lever 17 which is fulcrumed on the platform 3, as at 23, and is biased by a helical spring 7. One end of the spring 7 is connected to the free end of the lever 17, as at 22, and the other end of the spring 7 is affixed to a post 21 of the platform 3. The latter is reciprocable toward and away from the motor 1. The cassette 10 constitutes a means for indirectly moving the platform 3 toward the motor 1, i.e., to the position shown in FIGS. 1 to 3, and the means for biasing the platform 3 to an idle or inoperative position (see FIG. 5) comprises a helical spring 15 which is attached to the frame 2.

Figure 5:
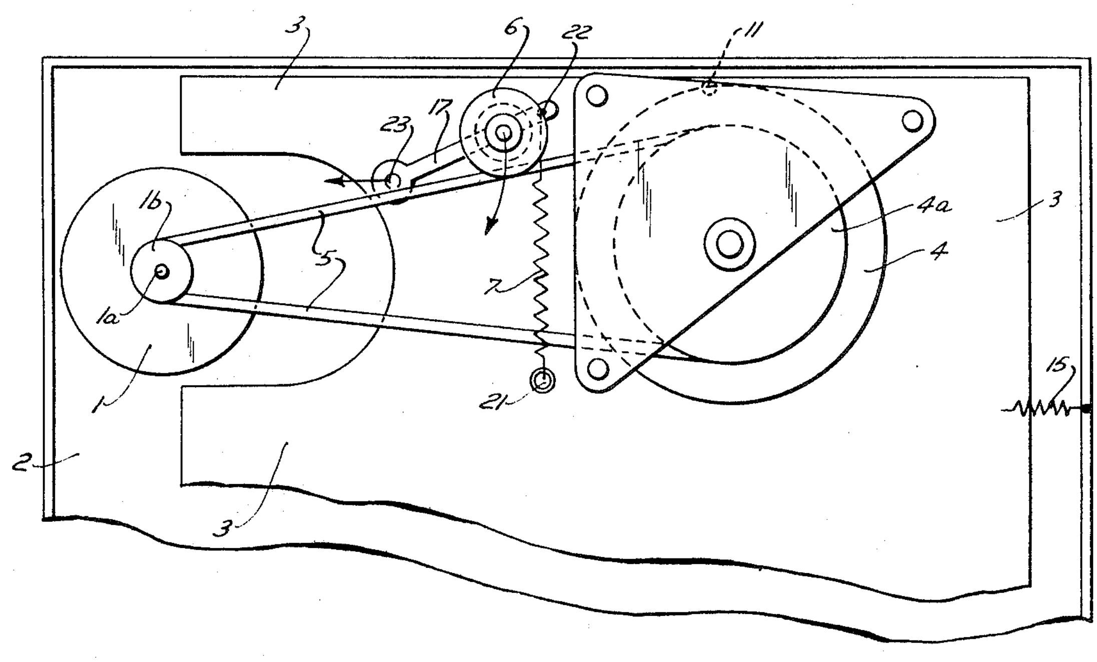
FIG. 5 is a view similar to that of FIG. 3 but showing the second support at a maximum distance from the prime mover.
Figure 4:
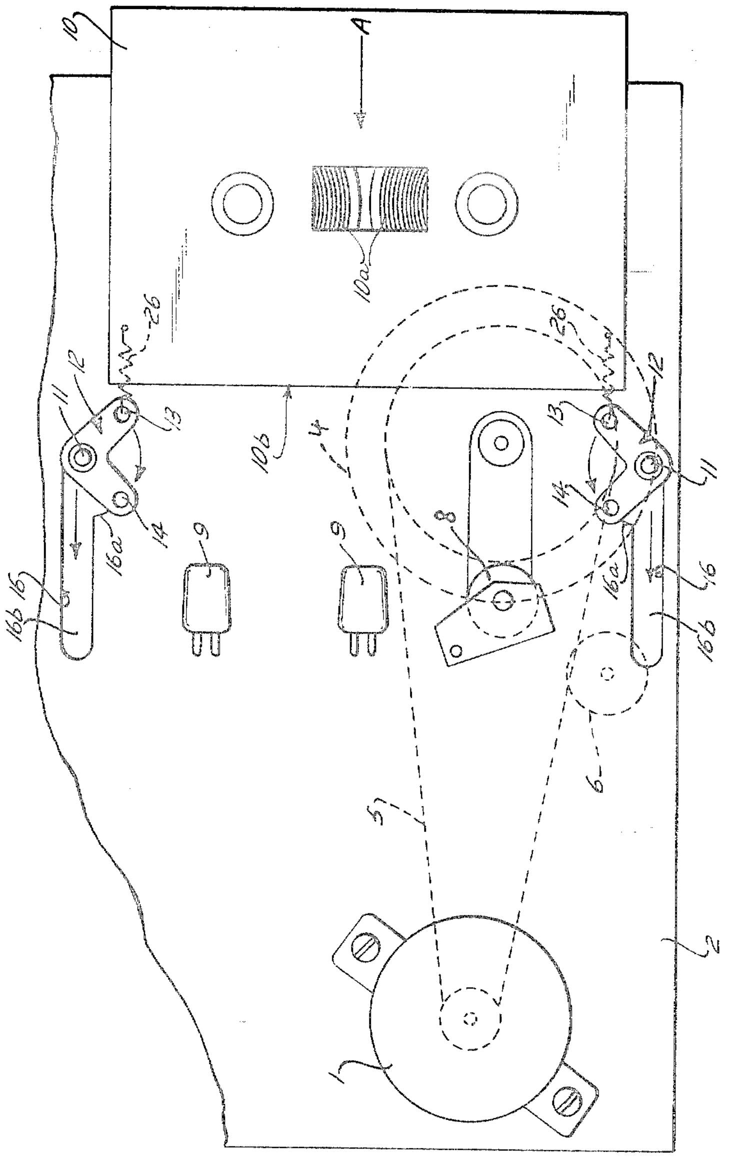
FIG. 4 is a top plan view of the structure shown in FIG. 1 but illustrating the second support at a maximum distance from the prime mover.

The motion transmitting means which shifts the platform 3 from the position of FIG. 5 to the position shown in FIGS. 1 to 3 when the cassette 10 is placed onto the deck 2*a* and moved in the direction indicated by arrow A comprises a pair of bell-crank levers 12 which are turnable on shafts 11 mounted on the platform 3 and extending upwardly through specially configurated recesses or slots 16 in the deck 2*a*. The levers 12 are biased by springs 26 which tend to turn them in opposite directions. With reference to FIG. 4, the lower spring 26 tends to turn the lower lever 12 in a clockwise direction and the upper spring 26 tends to turn the upper lever 12 in a counterclockwise direction. The arms 13 of the levers 12 then extend into the path of movement of the cassette 10. When the latter is properly placed onto the deck 2*a* and is thereupon moved in the direction indicated by arrow A, its front wall 10*b* engages the arms 13 and pivots the levers 12 against the opposition of the respective springs 26. The left-hand arms of these levers are provided with follower pins 14 which engage cam faces 16*a* flanking portions of the recesses 16 in the deck 2*a*. When the pins 14 move away from the cam faces 16*a* and are aligned with the straight portions 16*b* of the recesses 16, the cassette 10 can be rapidly shifted toward the motor 1 to thereby move the platform 3 to the position shown in FIGS. 1 to 3. Suitable detent means is provided for releasably holding the cassette 10 in the position of FIGS. 1 to 3. The spring 15 is stressed and can immediately return the cassette 10 to the position of FIG. 4 as soon as the aforementioned detent means is released. The pins 14 then travel along the portions 16*b* of the corresponding recesses 16 and thereupon along the cam faces 16*a* to automatically retain the platform 3 in the retracted position of FIGS. 4 and 5 when the cassette 10 is removed.

The tape deck 2*a* supports a rotary pinch roller or wheel 8 for the tape 10*a* as well as one or more sound heads 9 which engage the tape 10*a* when the cassette 10 is moved to the position shown in FIGS. 1 to 3.

An important advantage of the just described tape recorder is that the motor 1 is mounted on a stationary support, i.e., on the frame 2, but that the belt 5 is still subjected to requisite tensional stresses in each position of the platform 3. This is due to the provision of the tensioning device whose roll 6 bears against one stretch of the belt 5 between the pulleys 1*b*, 4*a* and causes the belt to remain under a certain minimum tension even at the time when the platform 3 is moved close to the motor 1 (FIGS. 1 to 3). When the cassette 10 is removed from the deck 2*a* and the platform 3 returns to the position of FIG. 5, the belt 5 acts on the roll 6 and causes the spring 7 to store energy. Since the motor 1 is mounted on a stationary part of the tape recorder, the latter can employ a rather weak spring (15) which tends to move the flywheel 4 away from the motor 1 in response to retraction of the cassette 10. The platform 3 carries a relatively small number of lightweight parts so that the spring 15 can readily displace this platform to inoperative position even if the tape recorder is held in a position in which the platform 3 must be moved upwardly in order to travel from the position of FIG. 3 to that shown in FIG. 5. Also, the likelihood of damage to the motor 1 is reduced considerably and the operator can displace the platform 3 with the exertion of a very small effort.

When the platform 3 is free to move to the position shown in FIG. 5, the belt 5 is subjected to a tensional stress which is somewhat greater than the stress when the cassette 10 assumes the position of FIG. 1. This is due to the fact that the spring 7 stores energy when the spring 15 is free to contract. The tension of belt 5 in operative position of the platform 3 suffices to insure rotation of the flywheel 4 when the motor 1 is started. This motor is an electric motor; however, it is equally within the purview of my invention to employ a spring motor or another suitable prime mover.

The allowable range of stretching of the belt 5 beyond its length in unstressed condition is preferably less than 8 percent. The maximum tension of the belt 5 depends on the length of the belt, on the diameters of pulleys 1*b*, 4*a*, and on the extent of movement of the platform 3 to its inoperative position. As a rule, the belt 5 is subjected to at least some stressing even at the time the platform 3 assumes the position shown in FIG. 3, i.e., when the distance between the flywheel 4 and the motor 1 is reduced to a minimum.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended

1. A driving mechanism, particularly for use in a cassette-type sound recording and reproducing apparatus, comprising a first support; a prime mover mounted on said first support and having a rotary output member; a second support; a rotary driven member mounted on said second support, said second support being movable toward and away from said prime mover to thereby respectively reduce and increase the distance between said members; an endless flexible element trained over said members to rotate said driven member in response to rotation of said output member; and yieldable tensioning means engaging said flexible element to stress the latter in each position of said second support, said tensioning means comprising a roll movably mounted on said second support and resilient means mounted on said second support and operative to bias said roll against a portion of said flexible element between said members.

2. A driving mechanism as defined in claim 1, further comprising first moving means for moving said second support toward said prime mover and second moving means for moving said second support away from said prime mover.

3. A driving mechanism as defined in claim 1, wherein said prime mover comprises an electric motor.

4. A driving mechanism as defined in claim 1, wherein said members are rotatable about parallel axes and said second support is reciprocable in a plane which is normal to said axes.

5. A driving mechanism, particularly for use in a cassette type sound recording and reproducing apparatus, comprising a first support; a prime mover mounted on said first support and having a rotary output member; a second support; a rotary driven member mounted on said second support, said second support being movable toward and away from said prime mover to thereby respectively reduce and increase the distance between said members; an endless flexible element trained over said members to rotate said driven member in response to rotation of said output member, said output member comprising a shaft and a pulley fixed to said shaft and said driven member comprising a flywheel and a pulley coaxial with said flywheel, said flexible element comprising a belt which is trained over said pulleys; and yieldable tensioning means engaging said belt to stress the latter in each position of said second support.

6. A driving mechanism, particularly for use in a cassette type sound recording and reproducing apparatus, comprising a first support; a prime mover mounted on said first support and having a rotary output member; a second support; a rotary driven member mounted on said second support, said second support being movable toward and away from said prime mover to thereby respectively reduce and increase the distance between said members; an endless flexible element trained over said members; to rotate said driven member in response to rotation of said output member; yieldable tensioning means engaging said flexible element to stress the latter in each position of said second support; first moving means for moving said second support toward said prime mover; and second moving means for moving said second support away from said prime mover, said second moving means comprising resilient means operating between said supports to permanently bias said second support in a direction away from said prime mover.

7. A driving mechanism, particularly for use in a cassette type sound recording and reproducing apparatus, comprising a first support; a prime mover mounted on said first support and having a rotary output member; a second support; a rotary driven member mounted on said second support, said second support being movable toward and away from said prime mover to thereby respectively reduce and increase the distance between said members; an endless flexible element trained over said members to rotate said driven member in response to rotation of said output member; yieldable tensioning means engaging said flexible element to stress the latter in each position of said second support; first moving means for moving said second support away from said prime mover, and second moving means for moving said second support toward said prime mover, said second moving means comprising a cassette.

8. A driving mechanism, particularly for use in a cassette-type sound recording and reproducing apparatus, comprising a first support including a portion adapted to support a cassette for movement between first and second positions; a prime mover mounted on said first support and having a rotary output member; a second support; a rotary driven member mounted on said second support, said second support being movable toward and away from said prime mover to thereby respectively reduce and increase the distance between said members; motion transmitting means for moving said second support toward said prime mover in response to movement of a cassette from one to the other position thereof; an endless flexible element trained over said members to rotate said driven member in response to rotation of said output member; and yieldable tensioning means engaging said flexible element to stress the latter in each position of said second support.

9. A driving mechanism, particularly for use in a cassette-type sound recording and reproducing apparatus, comprising a first support constituting the frame of a sound recording and reproducing apparatus; at least one sound head and at least one rotary element mounted on said first support; a prime mover mounted on said first support and having a rotary output member; a second support; a rotary driven member mounted on said second support, said second support being movable toward and away from said prime mover to thereby respectively reduce and increase the distance between said members; an endless flexible element trained over said members to rotate said driven member in response to rotation of said output member; and yieldable tensioning means engaging said flexible element to stress the latter in each position of said second support.